US010427054B2

(12) United States Patent
Wolgin

(10) Patent No.: US 10,427,054 B2
(45) Date of Patent: *Oct. 1, 2019

(54) COMPUTER PROGRAM FOR MARKETING AND SELLING FANTASY SPORTS AND/OR STOCK MARKET TEAMS

(71) Applicant: FANTASY INNOVATIONS, LLC, West Bloomfield, MI (US)

(72) Inventor: Jay Wolgin, West Bloomfield, MI (US)

(73) Assignee: FANTASY INNOVATIONS, LLC, West Bloomfield, MI (US)

( * ) Notice: Subject to any disclaimer, the term of this patent is extended or adjusted under 35 U.S.C. 154(b) by 51 days.

This patent is subject to a terminal disclaimer.

(21) Appl. No.: 15/837,178

(22) Filed: Dec. 11, 2017

(65) Prior Publication Data

US 2018/0104599 A1 Apr. 19, 2018

Related U.S. Application Data

(63) Continuation of application No. 15/299,201, filed on Oct. 20, 2016, now Pat. No. 9,868,066, which is a continuation of application No. 14/177,919, filed on Feb. 11, 2014, now Pat. No. 9,498,725.

(51) Int. Cl.
*A63F 13/828* (2014.01)
*A63F 13/792* (2014.01)
*G06Q 30/06* (2012.01)

(52) U.S. Cl.
CPC .......... *A63F 13/828* (2014.09); *A63F 13/792* (2014.09); *A63F 2250/22* (2013.01); *G06Q 30/06* (2013.01)

(58) Field of Classification Search
CPC ............................ A63F 13/828; A63F 13/537
See application file for complete search history.

(56) References Cited

U.S. PATENT DOCUMENTS

| | | |
|---|---|---|
| 6,371,855 B1 | 4/2002 | Gavriloff |
| 2006/0064184 A1 | 3/2006 | Ream et al. |
| 2007/0233585 A1 | 10/2007 | Ben Simon et al. |
| 2008/0154784 A1 | 6/2008 | Veeraraghavan |
| 2011/0319171 A1 | 12/2011 | Ngozika |

*Primary Examiner* — James S. McClellan
*Assistant Examiner* — Syvila Weatherford
(74) *Attorney, Agent, or Firm* — John A. Miller; Shumaker, Loop & Kendrick, LLP

(57) ABSTRACT

A computer program for marketing fantasy sports and/or stock market teams to potential investors, where an investor in a fantasy team shares in the winnings of that team. An owner of a fantasy sports team or a fantasy stock market portfolio offers his/her team up for sale or investment. The team can be sold in its entirety, or only a partial stake in the team can be sold, at the discretion of the owner. Potential investors view teams which are up for sale or investment, research team background and performance, and if desired, make an offer to buy a share of a team. Offers to sell and buy can be handled as either fixed price transactions or as auction-style bidding. Team owners split profits with investors according to ownership percentage. Investor pools and partnerships are possible, and many other features for facilitating investment transactions are disclosed.

20 Claims, 13 Drawing Sheets

"PUT TEAM UP FOR SALE" PAGE          100

**Offer to sell *Smith's Smashers* in league "*The Terrible Ten*"**

Sales Pitch – *attract potential investors in 150 characters or less*

> I have won this league 2 of the last 3 years and am sitting in 2<sup>nd</sup> plact right now. Easy money!

PROSPECTUS INFORMATION:

Percentage of team being offered: [30%]

Allow offers for more than percentage being offered?
- ○ Yes
- ⊙ No

Allow offers for less than percentage being offered?
- ○ Yes
- ⊙ No

Type of sale (select one):
- ○ Stated Price    Price = $[____]
- ⊙ Bid

Allow multiple investor bids to be accumulated?
- ○ Yes
- ⊙ No

Offer ending date (all bids end at 11:59 pm ET): [10/18/2013]

Auto sale price: [$150]
(*Price at which you will sell the designated percentage of the team without waiting for more bids*)

Flexibility Factor: [10]
(*Flexibility Factor restricts your transactions. See rules for more information.*)

CLICK HERE TO START THE BIDDING!

FIGURE 4

"PROSPECTUS" PAGE 200

Prospectus

Team Name – Smith's Smashers

Team Owner – Michael Smith  *click to view seller profile*

Percentage of team for sale – 30%  *bids allowed for more OR less*

Type of sale – Bid

Bid End Date – October 18, 2013

Auto Sale price – $150

Flexibility Factor – 10 points  (*what is this?*)

League Name – The Terrible Ten

League Fee – $250

Weekly payouts – $25 for high points for the week

Season Prizes:
    1st place - $1,200
    2nd place - $500,
    Highest total points for regular season - $400

Playoff Format – Begin week 14, 3 week playoff: 2 Division winners, Next three best records, 6th spot to most points.

Co-Owner rating – 8.6 out of 10.0  *Read comments*

Seller rating – 8.1 out of 10.0  *Read comments*

Current Standings:
(through week 6)

| Team Name | Points Scored | Points Against |
|---|---|---|
| The Force | 901 | 753 |
| Smith's Smashers | 892 | 788 |
| The Enforcers | 851 | 799 |
| Knight Rider | 911 | 866 |
| CJ all day | 842 | 801 |
| Miracle men | 817 | 843 |
| The old man | 796 | 870 |
| Texas 2 steps | 791 | 880 |
| JW | 743 | 862 |
| The Machine | 766 | 848 |

MAKE AN OFFER
MAKE A PARTIAL OFFER
MAKE A VALUATION

FIGURE 5

"VIEW OFFERS" PAGE    300

Your Offers

View --

| Highest Dollar Offer | Highest Percentage Offer | Highest Offer Per Share | All Offers | Valuations (7) |

High Bidder -- Fantasyman2  *click to view investor profile*

Investor Rating -- 8.5  See comments

Amount of Bid - $90

Percentage of Team -- 30%

Valuation (calculated) - $300

Comments: I have won multiple leagues and am considered an expert. I can help you win this league.

Time Remaining for Bids -- 1 day, 4 hours, 32 minutes

Accept Offer

Counter Offer

Reject Offer

FIGURE 6

"INVESTOR PROFILE" PAGE

Investor Profile

Fantasyman2

Name – David Johnson

Hometown – Pittsburgh, PA

Age – 43

E-mail address: fantasyman2@fantasyland.com

Favorite teams – Pittsburgh Steelers, Pittsburgh Penguins

Years of fantasy sports experience – 8

Co-Owner rating – 9.3 out of 10.0   Read comments

Investor rating – N/A out of 10.0   Read comments

Seller rating – 9.5 out of 10.0   Read comments

Investor Pools – The Fantasy Sharks

Teams currently invested in – 2

View previous investments

View current fantasy teams

Return to VIEW OFFERS Page

FIGURE 7

"FIND INVESTMENT OPPORTUNITIES" PAGE     500

Find Investments

○ Browse All Investment Opportunities

OR

⊙ Filter Based on Search Criteria
- ☑ Fantasy Sport — Football
- ☑ Prize Payout Range — > $1000
- ☑ Prize Payout Type — Weekly
- ☐ "Stated Price" only
- ☐ Flexibility Factor
- ☐ All Teams or For Sale Teams Only
- ☐ Show Teams Which Allow Unsolicited Offers
- ☑ Specified Players — Calvin Johnson
- ☑ Minimum League Age — > 1 yr.
- ☐ Number of Teams for Sale by Owner
- ☐ Percentage of Team Offered
- ☐ Minimum Co-Owner Rating
- ☐ Minimum Seller Rating
- ☐ Fantasy League Scoring System

SEARCH      CANCEL

FIGURE 8

"TEAMS FOR SALE WHICH MEET INVESTOR CRITERIA" PAGE

600

THE FOLLOWING OFFERS MEET YOUR CRITERIA OF:

> Fantasy Football, League prize payouts > $1000, pay weekly prizes, league in existence > 1 year, rosters with Calvin Johnson, % for sale > 20%

RB DUO OF MARSHAWN & AP with BREES & MEGATRON!! 3rd place in 10 man league, hottest team in the league!! Top 3 scorers = Adrian Peterson, Drew Brees & Calvin Johnson (3rd place of 10)

I have won this league 2 of the last 3 years and am sitting in 2nd place right now. Easy money! Top 3 scorers = Calvin Johnson, Aaron Rodgers & Jimmy Graham (2nd place of 10)

Already took 3 high of the week prizes and in first place with MJD coming off IR in 2 weeks! Top 3 scorers = Calvin Johnson, AJ Green & Marshawn Lynch (1st place of 10)

I'm struggling here, could use some help. Still probably in the playoffs, could be a great return on your investment! Top 3 scorers = Calvin Johnson, Dez Bryant & Andy Dalton (7th place of 12)

Playing in a league with a bunch of first-tmers!! Join me and let's take all their $$! Top 3 scorers = Tony Tony Romo, Calvin Johnson & Brandon Marshall (2nd place of 10)

Stafford to Calvin = money in my pocket! Top 3 scorers = Matthew Stafford, Calvin Johnson & Frank Gore (4th place of 12)

No time to manage my team anymore . Will sell 100% to best offer > $50 Top 3 scorers = Calvin Johnson, Andrew Luck & Larry Fitzgerald (6th place of 12)

Need to recoup some cash. Currently in 5th, but top 8 make playoffs. Won 2 of last 3 weeks. Make me an offer!! Top 3 scorers = Arian Foster, Calvin Johnson & Matt Forte (5th place of 12)

FIGURE 9

"TEAM INFO" PAGE 700

Smith's Smashers

Team Owner – Michael Smith

Profile    Transactions    Other Fantasy teams owned

Previous year's results    E-mail owner

ROSTER:

- QB: Aaron Rodgers (GB)    Alex Smith (KC)

- RB: Jamaal Charles (KC)    Steven Jackson (ATL)
  Ryan Mathews (SD)    John Kuhn (GB)

- WR: Calvin Johnson (DET)    Roddy White (ATL)
  Eric Decker (DEN)    Anquan Boldin (SF)

- TE: Jimmy Graham (NO)    Jason Witten (DAL)

- K: Sebastian Janikowski (OAK)

- D/ST: Steelers    Eagles

League Settings    Draft Results    Weekly Scoreboard

MAKE AN OFFER
MAKE A PARTIAL OFFER
MAKE A VALUATION

FIGURE 10

"BID" PAGE 800

OFFER

Team Being Bid Upon – Smith's Smashers

Percentage of team to be purchased – 30%

Amount of Bid – $90

Valuation – $300

Comments: I have won multiple leagues and am considered an expert. I can help you win this league.

Search for potential investing partners with similar valuations of this team

View other bidders who may be interested in forming a partnership

SUBMIT BID    CANCEL

FIGURE 11

COMPUTER PROGRAM FOR MARKETING AND SELLING FANTASY SPORTS AND/OR STOCK MARKET TEAMS

CROSS-REFERENCE TO RELATED APPLICATIONS

This application is a continuation application of U.S. patent application Ser. No. 15/299,201, titled COMPUTER-IMPLEMENTED METHOD FOR MARKETING AND SELLING FANTASY SPORTS AND/OR STOCK MARKET TEAMS, filed Oct. 20, 2016, which is a continuation application of U.S. patent application Ser. No. 14/177,919, titled METHOD AND SYSTEMS FOR MARKETING AND SELLING FANTASY SPORTS AND/OR STOCK MARKET TEAMS, filed Feb. 11, 2014 (Issued on Nov. 22, 2016 as U.S. Pat. No. 9,498,726).

BACKGROUND OF THE INVENTION

Field of the Invention

This invention relates generally to creating a secondary investor's market for fantasy sports or stock market teams and, more particularly, to a method and systems by which an owner of a fantasy sports team or fantasy stock market portfolio can offer for sale all or a percentage of their fantasy team at an auction or at a specified price, and receive offers from potential investors, where investors in a team share in the prize winnings of the team in the league in which it competes.

Description of the Related Art

Fantasy sports leagues have grown in popularity as more of the world's population has gained access to the internet, and more people have constant connectivity via smart phones, tablets and other mobile internet devices. In a typical fantasy sports league, team owners each create a virtual team consisting of players from an equivalent real sports league, and the fantasy teams compete against each other based on the actual game performance of the players in the real sports league. For example, in a fantasy football league, teams consist of various position players from the National Football League (NFL), and after NFL games are played each week, the fantasy teams receive points based on the passing performance of their quarterback, the rushing performance of their running backs, the receiving performance of their wide receivers and tight ends, etc.

Fantasy stock markets function similarly to fantasy sports team leagues, except that in fantasy stock markets, a virtual portfolio consisting of stocks, bonds, mutual funds, or other market-driven securities is evaluated against other portfolios based on actual market performance.

In both fantasy sports and fantasy stock market leagues, team owners pay a fee to enter a team in the league, and prizes are awarded at season's end, and in some cases also periodically throughout the season (e.g., weekly), based on the performance of the fantasy team or portfolio. Some people take these fantasy leagues very seriously, and spend considerable time analyzing which players to select for their team or which stocks to select for their portfolio, with the intention of winning prize money exceeding their up-front league fees. Thus, a fantasy sports/stock team which competes within a league that offers prizes is an asset to its owner. Like any other asset, there should be a way to liquidate the fantasy team—that is, to offer it up for sale or investment. A suitable outlet to do this does not currently exist as it does for most other assets.

SUMMARY OF THE INVENTION

In accordance with the teachings of the present invention, a computer program is disclosed for marketing fantasy sports and/or stock market teams to potential investors, where an investor in a fantasy team shares in the winnings of that team. An owner of a fantasy sports team or a fantasy stock market portfolio offers his/her team up for sale or investment. The team can be sold in its entirety, or only a partial stake in the team can be sold, at the discretion of the owner. Potential investors view teams which are up for sale or investment, research team background and performance, and if desired, make an offer to buy a share of a team. Offers to sell and buy can be handled as either fixed price transactions or as auction-style bidding. Team owners split profits with investors according to ownership percentage. Investor pools and partnerships are possible, and many other features for facilitating investment transactions are disclosed.

Additional features of the present invention will become apparent from the following description and appended claims, taken in conjunction with the accompanying drawings.

BRIEF DESCRIPTION OF THE DRAWINGS

FIG. 4 is an illustration of a web page for offering a team for sale or investment in accordance with the invention;

FIG. 5 is an illustration of a web page for viewing a prospectus of a team for sale or investment in accordance with the invention;

FIG. 6 is an illustration of a web page for a seller to view offers for their team in accordance with the invention;

FIG. 7 is an illustration of a web page for displaying an investor profile in accordance with the invention;

FIG. 8 is an illustration of a web page for finding investment opportunities in accordance with the invention;

FIG. 9 is an illustration of a web page for viewing a list of teams for sale which meet a potential investor's criteria in accordance with the invention;

FIG. 10 is an illustration of a web page for viewing the details of a team for sale or investment in accordance with the invention;

FIG. 11 is an illustration of a web page for a potential investor to submit an offer or bid to invest in a team in accordance with the invention;

DETAILED DESCRIPTION OF THE EMBODIMENTS

Figure 1:
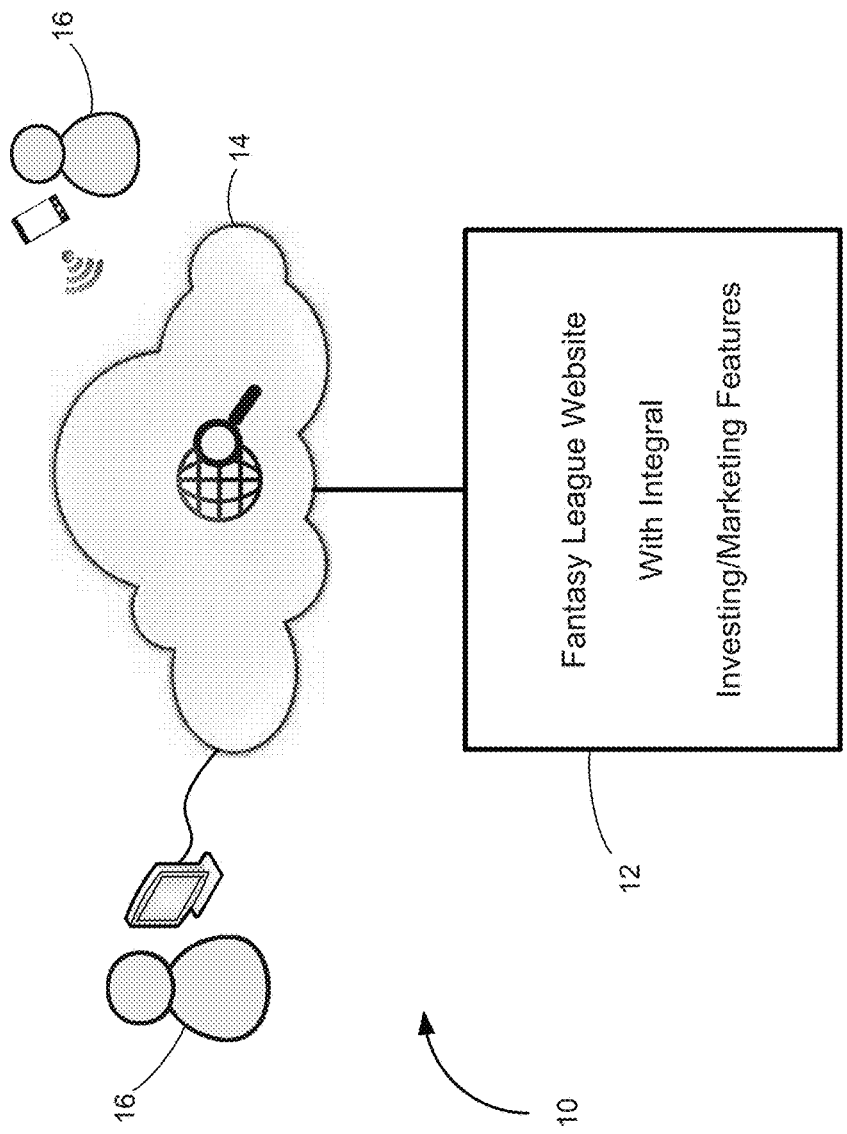
FIG. 1 is an architecture diagram of a web-based system for marketing fantasy sports and/or stock market teams, according to a first embodiment of the invention.

The following discussion of the embodiments of the invention directed to a computer program for marketing fantasy sports and/or stock market teams to potential investors is merely exemplary in nature, and is in no way intended to limit the invention or its applications or uses.

Fantasy sports may be defined as a competition which involves more than one participant competing against each other by selecting an individual or groups of athletes from a particular sport and comparing their performances in real-world games. A winner of the fantasy sports competition is determined based on the real-world statistical performance of the athletes selected for any given time period being measured.

A fantasy stock market may be defined as a competition which involves more than one participant competing against each other by selecting a group of stocks, bonds, mutual funds or other market driven securities and comparing their real-world market performance against each other within a specified time period in order to determine a winner. Much of the ensuing discussion is written in terms of fantasy sports, but is equally applicable to fantasy stock markets.

A fantasy sports "league commissioner website" is a website which hosts a fantasy sports league and has built-in functionality to store individual team assets on each owner's team and accumulate statistical data in order to determine scoring outcomes for the league. A similar concept exists for fantasy stock markets, where a particular website hosts the "league". These websites may or may not collect and distribute league fees from the participants. In order for the techniques of the disclosed invention to be applicable, there must be a mechanism of collecting league fees before a portion of a team is sold, as well as a mechanism for distributing the winnings of the team to the proper team owners.

An owned asset is a particular component of an owner's fantasy sports team or fantasy stock market portfolio. For example, an owned asset may be a player on a Major League Baseball team for a fantasy baseball league, a professional golfer in a fantasy golf league, a team defense in the National Football League for a fantasy football league, a stock or mutual fund in a fantasy stock market league, or whatever it is determined in each particular league will earn points for an owner.

A fantasy sports or stock market team which competes within a league which offers prizes is an asset to its owner. Like any other asset, there should be a way to liquidate it. A suitable outlet to do this does not currently exist as it does for most other assets. The present invention provides such an outlet.

The invention disclosed herein may be utilized in the form of a fully functioning fantasy sports league commissioner website, as a standalone website which extracts data from an existing fantasy sports league commissioner website, or as an application on a mobile device which can retrieve data from existing fantasy sports league commissioner websites. The disclosed techniques are applicable to all fantasy sports, including, but not limited to; baseball, football, basketball, hockey, golf, soccer, cricket and automobile racing, as well as fantasy stock markets. According to various embodiments of the invention, a computerized secondary market is created which allows an opportunity for fantasy team owners to offer for sale all or a percentage of their fantasy team at an auction, or at a specified price they have determined in advance they will accept. A website or application developed in accordance with the invention will generate a listing of this sale offer and match up sellers with potential investors. Investors in a fantasy team will share in any future winnings the fantasy team earns pro-rated by their percentage purchased. Members of a fantasy league will be excluded from purchasing shares of teams within the same league in order to prevent collusion amongst team owners.

Various embodiments of the disclosed invention are envisioned. FIG. 1 is an architecture diagram of a web-based system 10 for marketing fantasy sports and/or stock market teams, according to a first embodiment of the invention. In this first embodiment system 10, a fantasy sports league commissioner website 12 would either be built with the features of the invention integrated into it, or the features of the invention can be added to an existing fantasy sports commissioner website 12. All functionality of the invention described herein would be built into the league commissioner website 12, which would communicate with the internet 14. Users 16 would interact with the website 12 via the internet 14, using a computer, tablet, smart phone or other mobile internet device.

Figure 2:
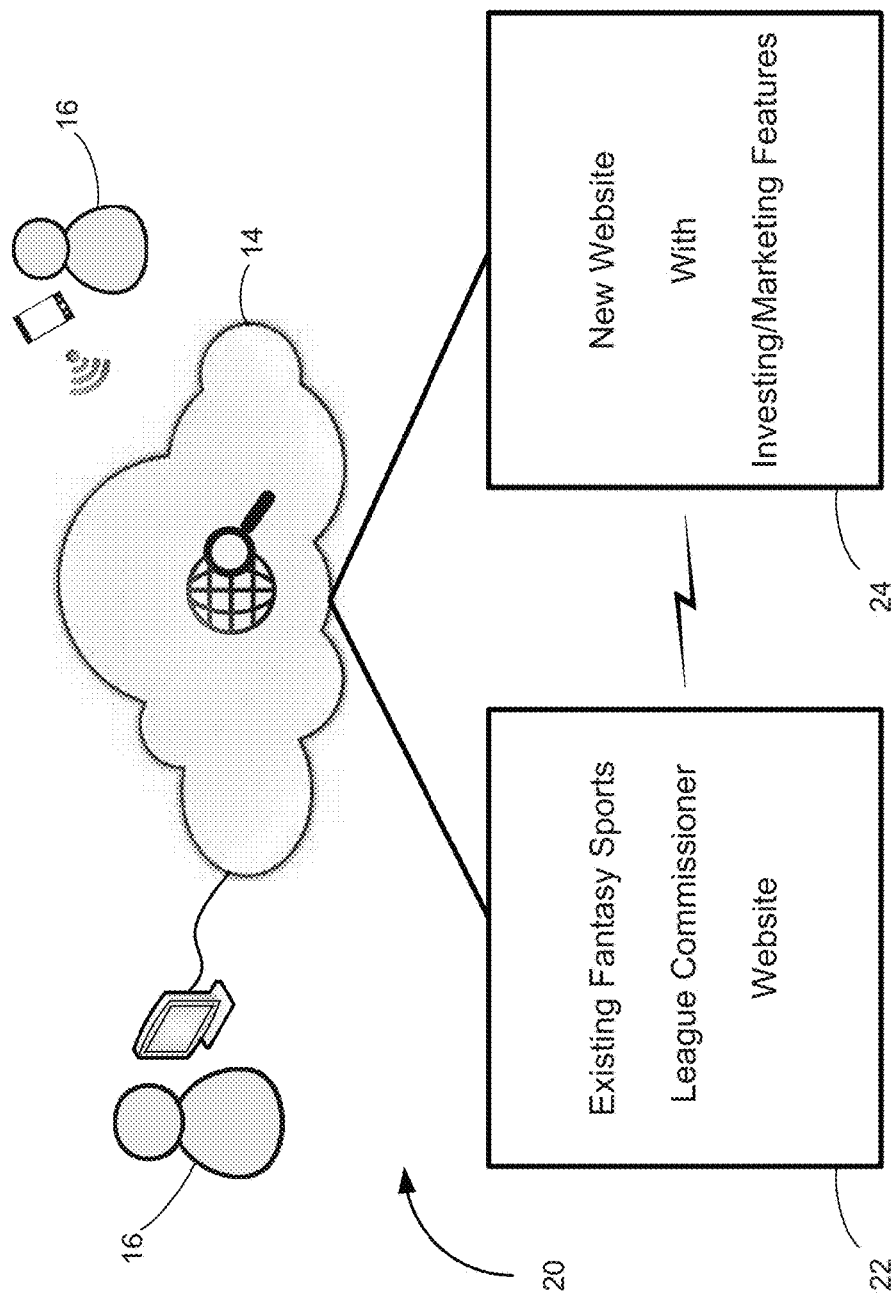
FIG. 2 is an architecture diagram of a web-based system for marketing fantasy sports and/or stock market teams, according to a second embodiment of the invention.

FIG. 2 is an architecture diagram of a web-based system 20 for marketing fantasy sports and/or stock market teams, according to a second embodiment of the invention. In this second embodiment system 20, the features of the invention would not be built into a league commissioner website 22, but rather a standalone investing/marketing website 24 that includes only the functionality of the invention. Data could be extracted from one or more league commissioner website 22 by the investing/marketing website 24, in order to provide potential investors with all pertinent information. Any data that could not be extracted from the league commissioner website 22 could be manually entered on the standalone investing/marketing website 24 by a seller. In the system 20, the league commissioner website 22 and the investing/marketing website 24 would each communicate with the internet 14. The lightning bolt conceptually represents the transfer of data from the website 22 to the website 24, although the actual data transfer would be routed through the websites' connection to the internet 14. Users 16 would interact with the league commissioner website 22 for league transactions such as building teams and trading players, and the investing/marketing website 24 for transactions in the secondary investing market of the disclosed invention, via the internet 14.

Figure 3:
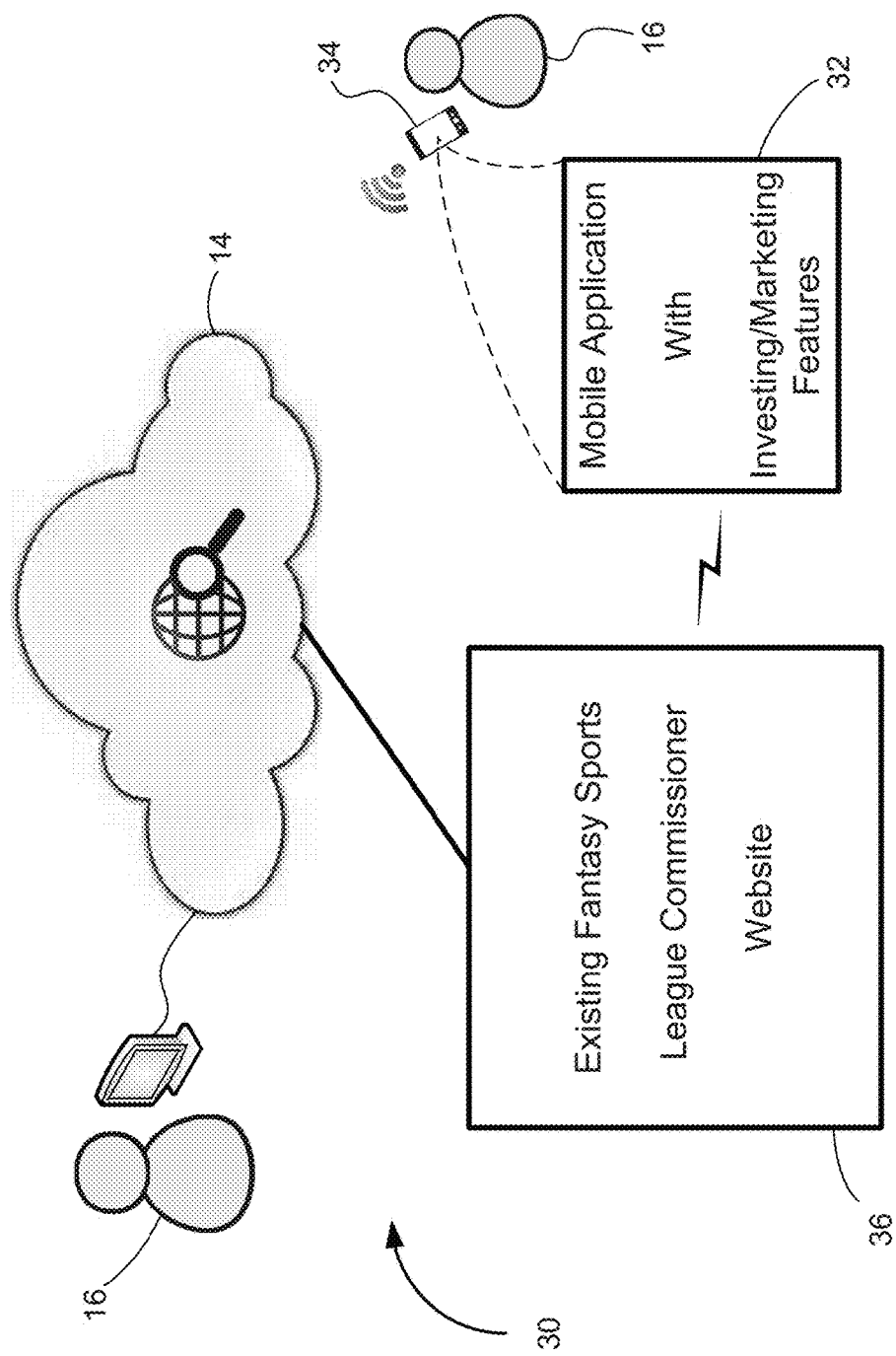
FIG. 3 is an architecture diagram of a system with a mobile device application for marketing fantasy sports and/or stock market teams, according to a third embodiment of the invention.

FIG. 3 is an architecture diagram of a system 30 for marketing fantasy sports and/or stock market teams, according to a third embodiment of the invention. In this third embodiment system 30, the features of the invention would be built into an application ("app") 32 which runs on a mobile device 34. In this embodiment, the users 16 would interact with a league commissioner website 36 (via the internet 14) for all league-related activity, such as creating a team and trading players. On the other hand, all fantasy sports investing and marketing activities would take place using the app 32 on the mobile device 34, which wirelessly communicates with the internet 14. That is, team owners could put their assets up for sale, and potential investors could shop for potential investments, using the app 32. The app 32 can extract data—such as team make-up, player and team performance, and team prize winnings—from the league commissioner website 36 (via the internet 14).

The remainder of the discussion in this disclosure will describe in detail the features of the method and system for marketing fantasy sports and/or stock market teams. The discussion will be structured as follows:
    OFFERING A FANTASY TEAM UP FOR SALE
    POTENTIAL INVESTORS—FINDING AN INVESTMENT
    MAKING AN OFFER
    PARTNERSHIPS AND POOLS
    OTHER FEATURES

USER SETTINGS

In the ensuing discussion, the term "team owners" will be used generically to represent owners of fantasy sports teams or fantasy stock market portfolios. Similarly, the terms "investors" and "potential investors" will represent people looking to make an investment in a fantasy sports team or a fantasy stock market portfolio. References to "the website" (other than references specifically to a "league commissioner website") refer to any of the embodiments of a website or mobile app, shown in FIGS. 1-3 discussed above, containing the features of the invention disclosed herein. References to a "user" or "users" describe any user of the website or app, whether a team owner or a potential investor. The discussion will be supplemented by figures which depict simulated screen images from the invention website or app.

Offering a Fantasy Team Up for Sale

FIG. 4 is an illustration of a web page (or app page) 100 which would be completed by a team owner offering a team for sale or investment. The web page 100 and those that follow are meant to be representative of web pages that would be included in the fantasy sports and/or stock market marketing/investing website of the invention, or screens from the mobile application 32 of FIG. 3. The web/app pages are included for illustrative purposes, to facilitate the accompanying discussion. The exact layout of the pages may vary during implementation. For example, additional data fields may be included, data fields may be rearranged, etc. Unless otherwise noted, data fields inside a box are items input by the user on that web/app page, and underlined items are links which may be clicked upon to either take the indicated action or take a user to a web/app page containing the indicated information. These screen illustrations will henceforth be referred to as web pages, but could be website or app pages.

When a team owner wants to offer a fantasy team up for sale or investment, the owner will first be asked to create a sales pitch, as shown on the web page 100. The sales pitch will be the first thing potential investors see in order to draw them to a fantasy team to invest in. The sales pitch will be a brief summary which is limited in length, to approximately 150 characters, for example.

In order to place their fantasy team up for bid, a team owner must provide, as shown on the web page 100, the following information which will be included in the team for sale prospectus:

Percentage of team for sale—The seller may specify a specific percentage they would like to sell, or may select "any" which will allow potential investors to bid on whatever percentage of the team they would like to purchase, up to one hundred percent. The seller will have the option to choose "allow investors to bid for more than the percentage for sale" and "allow investors to bid for less than the percentage for sale". Selecting either option will allow them to receive offers for a higher or lower percentage of their team than they have put up for sale. If this option is not selected, investors will only be able to bid for the percentage stated for sale.

Type of sale—The seller may select a "stated price" type of sale, in which a specified asking price will be set by the seller, or select a "bid" option which will not specify a price and will allow potential investors to bid on the percentage of the team up to the amount for sale. An option will also be provided for a seller to sell their desired percentage to multiple investors if each of those investors bid for a smaller share of the team than the amount being offered. (Example—a team owner places 30% of their team up for bid. One investor offers their asking price pro-rated for 20% of the team and another investor offers the asking price pro-rated for 10% of the team. The seller can accept both offers in order to achieve the 30% sale at their asking price).

Asking price—If a "stated price" offer is being made, a seller will enter the amount they are offering to sell their specified percentage of their team for. On the web page 100, a bid type sale is shown, and therefore the Price field is grayed out (inactive) for the Stated Price option.

Offer ending date and time—This will specify when the bidding will end if a bid type sale or will be an option to put an expiration date on a stated price type of sale, if desired. For a stated price type of sale, the seller will have the option to have no expiration date of the offer.

"Auto-sale" price—This will only be applicable if the type of sale is a bid. The auto-sale price is the price at which the seller will sell the percentage being offered without waiting for the bidding process to end based on their specified bidding end date and time. If an offer for more or less than the specified percentage is made that is equivalent to this auto sale price when pro-rated, the seller will receive an immediate notification, either by e-mail and/or website notification that there is an offer that meets their auto sale price but for a different percentage than they offered. The seller will have the ability to immediately accept this offer if they desire.

Flexibility Factor—This is a new idea regarding a team owner's flexibility to substitute starting players in a game, which is an innovation for fantasy sports, and will be defined in detail later within this document. A seller of a team may offer to assign a flexibility factor to their team if it is sold. Within the prospectus, they can choose the amount of flexibility factor they are willing to offer, or can choose to have no flexibility factor.

FIG. 5 is an illustration of a web page 200 which shows a prospectus for a team being offered for sale. The prospectus page 200 is for a team in a fantasy football league. The team name and team owner's name are listed on the prospectus, which also includes a link to a seller profile. Clicking on the seller's name will take an investor to a seller's profile page, which is created and maintained by the seller, and which includes the following information about the seller:

Seller Profile—
    Age
    Hometown
    Favorite Teams
    Links to all current & previous fantasy teams to see prior results
    Link to seller email/contact information
    A link to a listing all of the fantasy league transactions by the seller (adding and subtracting owned assets to their team)
    A listing of the seller's previous years' finishes in the standings of the league, if more than one year's data is available; if a league is using the website/application for the first time, they will be given the opportunity upon the setup of the league to enter previous year's results
    Any other relevant data that does not violate any privacy issues As shown on the prospectus page 200, in addition to the items described above on the web page 100, a prospectus will also include other information about the team for sale, which can often be extracted from the fantasy league website. Any items that cannot be extracted from fantasy league data will be prompted to be manually entered by the fantasy team owner. These team- and league-related items include the following:

- League name—the name of the league in which the fantasy team is playing, with a link to take an investor to the league's homepage in order to research information about the league. Potential investors will have full viewing capabilities of the league so they can browse all the teams in the league, league rules and settings, previous transactions, draft or auction results, as well as the current standings.
- League fee—the fee paid by a team owner to enter a team in the league.
- Weekly payouts—If a league offers weekly prizes, they will be listed here, or "N/A" if no weekly prizes.
- Season prizes—First place payout, second place payout if any, and any other prizes that are awarded at the conclusion of the fantasy season.
- Playoff Format (will not show, or will be shown as "n/a", for season total point leagues or other league types that do not have playoffs) —Information relating to when the league playoffs start, how many teams make the playoffs and what criteria is used to determine which teams make the playoffs.
- Co-owner rating—When a league is formed, all owners are asked to rank their fellow league members on a scale of 1 to 10 (1 being the lowest ranking, 10 being the highest) based on previous years in the league (unless this is a first year league), along with any comments. The seller's average rating, as well as all comments can be viewed by potential investors. Co-owners will also be prompted to update these ratings at the end of the season in order to gain the most updated rating possible for each team owner.
- Seller rating—If applicable, a rating of 1 to 10 (1 being the lowest, 10 being the highest) given to the seller from any previous investors. Potential investors can see the average rating of a seller, as well as any comments from previous investors in the seller.
- League summary—A snapshot of the current standings of the fantasy league to which the team being offered belongs. The league summary will show any relevant data that can be shown in summary form including, but not limited to; points scored, points against, current standings and current return on assets.

The prospectus page 200 will also include links or buttons to allow a potential investor who is viewing the prospectus to make an offer to buy, make a partial offer, or make a valuation of the team (described later).

As discussed briefly above, different types of offers to sell are available. Sellers may receive notification of either a bid or stated price offer via e-mail and/or website notification, depending on the preference they have set in their user settings. A team owner with an offer to sell will be notified of the status of their offers, as follows:

If a "bid" type sale is offered, sellers will receive notification of the highest bid via e-mail once the bidding process is finished. The seller may choose to accept, counter offer, or decline the highest bid. The seller may counter offer the percentage being purchased, the purchase price, or both.

If the type of sale is a "stated price", the seller will be notified as soon as they have received an offer that is equivalent to their asking price (or the equivalent to the asking price based on a pro-rated basis for the percentage of the team being bid on, if the seller selected this option). The seller can accept or reject the offer.

In addition to the offer notifications described above, sellers will be able to check on their offers at any time. FIG. 6 is an illustration of a web page 300 which would be used by a team owner to view offers which have been received. A seller can view all of their offers, their highest dollar offer, their highest percentage of team to be purchased offer or their highest offer per share, as selected by the buttons on the "View Offers" page 300. It is noted that on the "View Offers" page 300 and throughout the website or app, the buttons may be alternately represented as drop-list entries, radio buttons, or any other suitable interface type. After deciding which of their offers they want to see, the seller will see the following information about the offer(s):

- High Bidder name—The investor's screen name with a link to view their investor profile. The investor profile is described below.
- Investor rating (Can also be viewed in the investor's profile page)—Previous sellers to this investor, if any will rate the seller 1 through 10 (1 being the lowest, 10 being the highest) along with their comments. The investor rating will be an average score. The seller will also be able to see all comments.
- Amount of bid—The amount the high bidder is willing to pay for the percentage of the fantasy team they bid on.
- Percentage of team—The percentage of the fantasy team the high bidder is bidding on.
- Valuation—The dollar amount at which the potential investor is valuing the team (discussed further below). This is automatically calculated by dividing the amount of the bid by the percentage of the team being bid on.
- Comments—Any comments the potential investor wants the seller to see.
- Time remaining in the bidding process.

On the "View Offers" page 300, the seller will also be provided with options to accept the offer, make a counter offer or reject the offer.

Potential Investors—Finding an Investment

FIG. 7 is an illustration of a web page 400 showing a profile of an investor who uses the website. The investor profile will include;

- Investor's "Screen Name"
- Investor's Name
- Age
- Link to investor e-mail/contact information
- Hometown
- Favorite Teams
- Years of fantasy sports experience
- Results of previous investments, if any
- Co-owner rating—If the investor is the primary owner of any fantasy team, their co-owner rating will be displayed along with a link to any comments that were made along with the rating
- Investor Rating—rating by previous sellers to this investor, if any (see below for details)
- Seller Rating—If the investor sold any of their primary fantasy teams, their seller rating will be displayed along with a link to any comments that were made along with the rating
- A link to current and previous teams they have invested in
- A link to their fantasy teams originated by the investor
- May also include any other relevant information that does not infringe upon any privacy issues The Seller Profile described above in the discussion of the prospectus page 200 would have a format similar to the Investor Profile page 400 of FIG. 7.

Potential investors will visit the website or app looking for opportunities to make an investment in a fantasy sports team. FIG. 8 is an illustration of a web page 500 which can be used by an investor to find investment opportunities. Potential investors will have the option to browse all investment opportunities, or to filter for any specific criteria to find sales offers they would prefer to invest in. The web page 500 of FIG. 8 is shown in a configuration where the investor has elected to filter on certain criteria. A check in a checkbox indicates the investor wants to filter on this parameter, as the value shown in the drop-list box indicates. Potential investors may add as many levels of filters as they choose in order to further refine their search, as long as they are not contradictory. Filters may include, but are not limited to:

- The fantasy sport they would like to invest in (football, baseball, etc.).
- The minimum or maximum amount of prizes that are available to be won in the fantasy league to be joined (for example, do not want to join a league where the winner earns less than $1,000).
- Flexibility Factors within a specified range.
- Type of Sale; if "Stated Price" only, then optionally include a maximum or a minimum price
- Teams to invest in who have specified athletes or owned assets on their rosters. (For example—a potential investor would like to invest in a fantasy football team with Peyton Manning on it. This investor would be able to filter their search for teams up for bid who have Peyton Manning on their roster.)
- Minimum number of years a fantasy league has been in existence.
- Minimum number of fantasy teams the seller has available on the website for viewing for historical performance.
- Minimum or Maximum percentages of teams being offered.
- Minimum co-owner rating (described above).
- Minimum seller rating (described above).
- Fantasy teams listed for sale only (do not include fantasy teams that allow unsolicited offers).
- Fantasy teams not listed for sale (only include fantasy teams that allow unsolicited offers but have not placed their team up for sale).
- Types of fantasy leagues (some leagues depending on the sport can have different scoring systems, such as head-to head, cumulative points or rotisserie style scoring).
- Types of prize payouts (some leagues pay weekly prizes for most points for a given week, some pay 1st, 2nd & 3rd place prizes for the season, some only pay 1st & 2nd place for the season, etc).

After defining any search criteria, the investor can click on the SEARCH button or link to submit the search for investment opportunities which meet the criteria.

FIG. 9 is an illustration of a web page 600 showing a list of teams for sale which meet a potential investor's criteria as defined above. The search will return all fantasy teams that fit the criteria listed in order of greatest relevance. As shown on the web page 600, the potential investor will see all fantasy teams' sales pitches as well as the three highest scoring owned assets on that fantasy team, and the team's current position in the standings of their league, along with any other relevant data, in order to help them decide which fantasy team to research further. A potential investor can then click on whichever team interests them in order to further research that team and owner. Clicking on a link will take the potential investor to the prospectus the fantasy team owner filled out when the team was offered for sale. If the team was not offered for sale, clicking on the link will provide all prospectus information that is available based on data available on the website, including information extracted from a fantasy league commissioner website.

From the prospectus page 200, and from various other pages in the website or app, a user can click on a team name to view details of the team. FIG. 10 is an illustration of a web page 700 for viewing the details of a team which an investor may wish to invest in. The team information page 700 includes the team owner name with links which can be followed to the seller's profile, transactions which the team owner has been involved in, other fantasy teams owned by the team owner, previous year's results, and an email link.

The team information web page 700 also includes a team roster. In the case of a fantasy football team, as shown on the page 700, the roster includes names of quarterbacks, running backs, wide receivers, tight ends, a kicker, and team defenses and special teams. Each of these players is a selectable link to take a user to statistics for the player, which would come from the fantasy league commissioner website. The team information web page 700 also includes links to league information—such as general league settings, draft results and a weekly scoreboard.

The team information web page 700 also includes links or buttons to allow a potential investor to make an offer to buy, make a partial offer, or make a valuation of the team. As discussed above, when an offer is made to buy all or part of a team, a valuation of the team is calculated as the amount of the offer divided by the percentage of the team being bid on. This is also seen on a "Bid" web page 800, discussed below. Potential investors may also place valuations on teams they view without submitting a bid. Non-bid valuations are useful in informing a team owner what the marketplace feels their team is worth. Non-bid valuations may be allowed from the Bid page 800, or from other suitable places in the system. The owner of the team will be able to view any such valuations given to their team and be able to solicit offers from these investors. Once a valuation is placed on a team, an option will be made available to be notified if that team goes up for sale. Potential investors may also search for other potential investors who have placed a similar valuation on a given fantasy team in order to facilitate investor partnerships. If two or more investors have placed a similar valuation on a team, they will be allowed to form a bidding partnership for the purposes of bidding on this team. Investor partnerships will be defined in greater detail later within this document.

Making an Offer

When an investor wishes to make a bid or offer to buy all or part of a team, the investor will click on a button to display a bid page 800, as shown in FIG. 11. The bid page 800 would be reached by a user who clicks on the "Make an Offer" or "Make a Partial Offer" link on the team info page 700 or the prospectus page 200. The bid page 800 will include:

- Percentage of team to be purchased—A potential investor will enter the percentage of the team they wish to bid on. Features will be provided to set the percentage equal to the amount offered for sale by the team owner, or higher or lower percentages if allowed by the team owner. May also be set lower than offered percentage in order to find prospective investment partners, as discussed below.
- Amount of bid—A dollar amount will be entered which reflects the amount the investor is willing to pay for their specified percentage of that fantasy team.

Valuation—As discussed above, the valuation will be automatically calculated based on the percentage of the team bid on and the dollar amount of the bid for that percentage, by dividing the "amount of bid" by the "percentage of team to be purchased". The result will be rounded to the nearest whole dollar.

Comments—Any comments a potential investor would like to make to the seller.

Links or buttons for submitting the bid, or for cancelling the bid.

Instead of bidding on the full amount of a team being offered for sale, an investor may bid on a partial amount with the intent of joining a group of investors with the same valuation that, as a whole, make up the entire percentage being offered. In order to do this, investors will submit the amount they want to bid and the percentage they would like to bid on. Their valuation will automatically be calculated by dividing the amount of the bid by the percentage bid on. If the seller has selected the option for multiple investors to make up their "stated price", the bid will be accumulated with other partial bids with a similar valuation in order to submit a full price offer to the seller.

Potential investors may also submit a bid for any percentage of any team in a paid league that is either on the website, or uses the application, even if the team is not up for sale. Fantasy team owners who participate in the investment/marketing functionality may set their individual user preferences to either allow or disallow unsolicited offers, or set a minimum price per percentage and/or a minimum percentage of their team for which they would like to be notified of an offer.

Partnerships and Pools

Investor Partnerships are another feature available on the website. Sellers may not always allow partial bids to be accumulated. In order to increase potential resources, potential investors may form partnerships with another investor. Investors can make themselves available for partnerships within their user settings, which will then allow other potential investors access to their profile, which will include their investor rating. Potential investors will find each other by clicking on a "search for potential investors with similar valuations" link when submitting a bid on a team or by clicking on the "View other bidders who may be interested in forming a partnership" link when submitting a bid.

The following features are available on the bid page 800 for initiating investor partnerships:

Search for potential investors with similar valuations—
  Clicking on this link will show the usernames of all other investors who have valued the fantasy team being bid on at the same or nearly the same value as you. This list may filtered. Filters will include, but not be limited to:
    Investors who have valued the fantasy team within a specified percentage or dollar amount of your own valuation
    Investors who have actually submitted a bid for this specific fantasy team
View other bidders who may be interested in forming a partnership—Clicking on this link will show a listing of all other potential investors who have submitted a bid on this specific fantasy team who have chosen to make themselves available for partnerships in their user setting. This list may be filtered based on the following or other factors:
  Equal valuation as you
  Within a specified dollar amount or percentage of your bid
  Minimum Investor rating
  Minimum bid amount made
  Minimum percentage of team bid on Once a partnership is formed, each partner must specify the amount of money they are contributing to the partnership, as well as their profit sharing percentages. All partners must confirm by electronic signature the profit sharing percentages and monetary contributions within a certain time period, such as within 24 hours of initiation, or the partnership will be disbanded. Once a partnership is formed, all decision making will be conducted through a proxy vote with voting rights being distributed in the same accordance as profit sharing percentages, unless specified otherwise. Investors can also search for potential partners without first identifying a specific team to bid on. Searches will allow filtering, which will include, but not be limited to:

Minimum Investor Ratings of other investor
  Certain geographic locations of other investor
  Minimum years of fantasy sports experience of other investor
  Favorite teams of other investor
  Minimum age of other investor Investor pools are another feature available on the website or app. In order to increase potential resources, potential investors may form pools of funds to be used to purchase multiple fantasy teams. Pools purchase shares of teams and distribute profits in accordance with ownership percentages. Decision making in these pools may either be by proxy vote in accordance with the amount of money invested into the pool, or a pool may elect a Pool Manager to make all investing decisions. Investors can search for existing pools to join which meet their criteria. Investors will also have the option to start their own pool and solicit other potential investors to join them, similar to the workings of a mutual fund. When starting their own pool, investors will have the following options:

Name of the Investor pool
  Minimum Investment amount to join the pool
  Maximum investment allowed
  Minimum and/or maximum amount of funds to be raised
  Minimum investor rating of potential pool participants
  Pool participants—how they are determined;
    Invite only
    Open to the public; can join automatically if criteria are met
    Open to the public; pool manager must approve them
  Pool Manager name—Most often the pool originator will be the pool manager, but any investor registered in the system can be named pool manager. The pool manager originates all investing decisions.
Fantasy sport(s) to be invested in
Type of voting;
  Proxy vote in accordance with percentage ownership in the pool (which will be determined by a pro-rating of the amount an individual investor contributes divided by the total of all money contributed).
  Pool Manager Control—The pool originator, or another investor designated by the originator will be designated "pool manager" and will make all decisions.
  Proxy vote/Pool Manager control Hybrid—The pool manager can reserve any percentage of the vote and the remainder will be divided amongst the other pool participants in accordance with their amount invested divided by the total amount invested.

Sales pitch—Brief description of the investment strategy and the founder of the pool; will be limited to a certain number of characters, to be defined upon website or app configuration How much the pool originator will be investing When searching for a pool to join, investors will be able to filter their search, or just browse all pool listings. Filters will include, but will not be limited to, the following:

Minimum investment required

Fantasy sports to invest in

Years of fantasy sports experience of the pool manager

Investor rating of the pool manager

Type of voting the pool allows (proxy, pool manager controlled or hybrid)

Other Features

In the following discussion, the concept of a "starting lineup" comes into play. As would be understood by one familiar with fantasy sports teams, a team owner may have more "owned assets" (players) on his team than are allowed to earn points for each scoring period according to the league rules. A starting lineup designates which of a team's owned assets will be used for scoring purposes during a particular scoring period. For example, a fantasy football team owner may have two quarterbacks on his team, but the league rules only allow for one quarterback to earn points during each scoring period. In this case, the team owner must designate one of the quarterbacks to be in his starting lineup for an upcoming game in order to earn points, while the other quarterback will not earn any points for that particular scoring period.

This section describes features which serve to enhance the effectiveness of the investment/marketing website or application. League commissioner websites and/or users may or may not choose to use these features based on their personal preferences, or due to the complexity of incorporating them onto their website or into their fantasy league rules. The features are as follows:

Proxy voting—Each transaction for a team with multiple owners due to a sale of the team using the website will be determined by a proxy vote of all the owners, with majority vote deciding the outcome. Voting powers will be determined in the same percentages as the percentage of the team owned. Transactions include adding or removing owned assets from a fantasy team, trading an owned asset from one team to another, or decisions on which owned assets to insert into a starting lineup, or whatever system is used to determine how to acquire points for that owned asset and which owned assets to deactivate. Any owner in a team may initiate a transaction, which will submit a vote via e-mail and website notification to all the other owners which will allow them to vote. Lack of a response to a vote within a specified time by a minority owner will exclude that investor from a vote and majority vote will still decide the outcome. Majority owners must vote on all transactions in order for them to count, or else the transaction will be voided. All votes must be cast within a certain time period, such as 24 hours, of the notification of a proxy vote or that owner's vote will be considered a vote in favor of the transaction.

Auto substitutions—In order to protect investors in a fantasy sports team, if a player in the starting lineup on a seller's fantasy team is not playing in a real-world game (because of injury, for example), there will be an auto substitution of the next highest rated player on the seller's team, based on current year averages. If current year averages are not available, prior year will be used. If the player is a first year player, a projected score for that week will be used.

Suspicious activity—Investors may file an appeal for any unusual activity if they feel it is not within normal fair play and may be of an unusual nature to possibly defraud the investor. Such actions may include, but are not limited to; a majority owner not responding to any transaction votes or neglecting the management of their team, perceived collusion amongst members of a league, or any strategic transaction by an owner or investor that appears to be intentionally harmful to the team as opposed to helpful. Either the website or application will have to employ mediators to rule on the appeals. All users will sign an agreement that the mediators may decide to fully refund an investor's money and exclude them from any future winnings of the team if either a ruling is in their favor, or if the investor is the majority owner of a team and the minority owners receive a ruling in their favor.

Flexibility Factor—A flexibility factor is a mechanism by which the investors of a team can have more protection and control over the team they are purchasing. The smaller the flexibility factor being offered by the seller, the less of a risk the investment will be and vice versa. A flexibility factor can be a whole number or a percentage that represents the average score or statistic of an owned asset which the seller will be allowed to substitute for another owned asset into a starting lineup, or on the team's overall roster, without the permission of every investor in their team. An owned asset that may be disallowed from a starting lineup due to the flexibility factor rules WILL be allowed if the preferred alternative owned asset is designated as not available during the scoring period by the league commissioner website due to injury, having a bye week, or any other reason that would prevent them from earning points. For example, in fantasy football, if a seller had offered a flexibility factor of 5 and had investors who purchased shares of the team, the seller may not start a quarterback who averages more than 5 points less than another quarterback on the team's roster. If the seller does want to start a player who averages less than their replacement, they would need to request permission from the investors along with an explanation of the reasoning behind the move. All owners must unanimously vote to allow the move or the seller may not do it. A lack of a vote by an investor will be considered a no vote. When determining the average score or statistic of an owned asset, current year averages will be used unless that data is not available (in the beginning of a new season). In that case, prior year averages will be used, or projected scoring if no prior year data exists (rookies).

In a situation where the features of the invention are embodied in a standalone website (FIG. 2) or mobile application (FIG. 3), flexibility factor will be processed in the website or application, but no locks or restrictions will exist on the associated league commissioner website. In order to protect an investor, a partial refund of investment will be available any time a flexibility factor agreement is broken, with the amount of refund to be determined upon implementation, or a full refund will be given. An investor will only have this refund option immediately after disallowing a specific roster transaction. The offer will expire after this one opportunity.

Payment methods—Payments for transactions can be accomplished in any of a variety of suitable fashions. Individual transactions can be paid for by credit/debit card, or by use of a third-party payment service. Transactions could also be paid for by the buyer mailing and the seller verifying receipt of a check or money order. The investing/marketing website or application may also include a deposit account feature, where buyers and sellers may keep a balance of funds, thus enabling and simplifying automatic payments for purchase transactions, disbursement of league winnings, etc.

Figure 12:
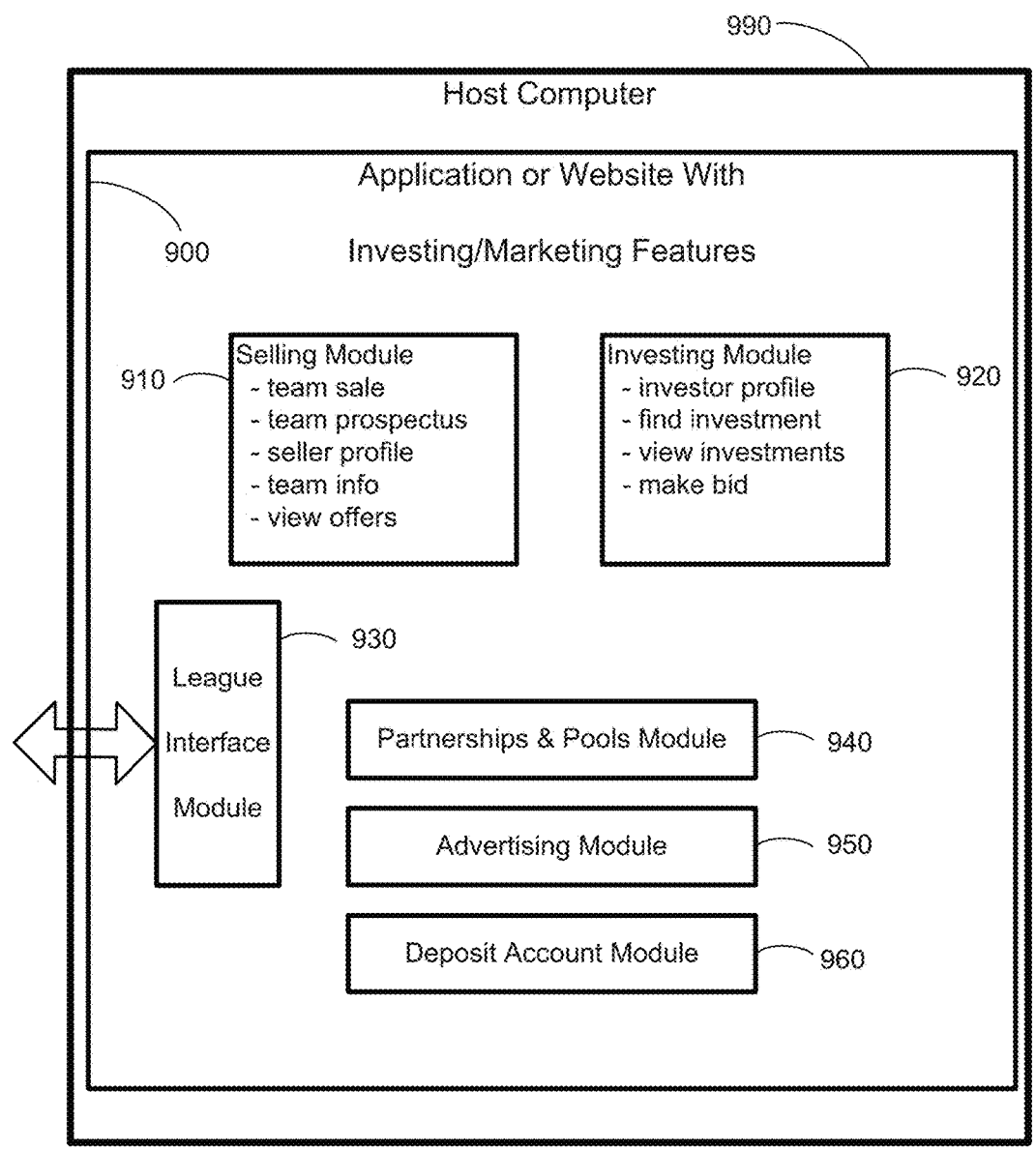
FIG. 12 is a block diagram of a software system for marketing fantasy sports and/or fantasy stock market teams.

Revenue Generation—Direct—the investing/marketing website or application may earn direct revenue by various methods, including, but not limited to, the following:
- Keeping a percentage of each buy/sell transaction as a broker fee
- Charging a flat fee per transaction as a broker fee
- Charging a combination of both a percentage of the transaction in addition to a flat fee as a broker fee
- Charging an annual or monthly user membership fee in order to use the website and have an active account
- Sale of the invention in the form of a mobile application Revenue Generation—Indirect—the investing/marketing website or application may earn indirect revenue by various methods, including, but not limited to, the following:
- Offering advertising space within the application and/or website
- Interest income earned on user account balances and fantasy league fees
- Sales of auxiliary items, including, but not limited to;
  - Fantasy draft boards
  - Fantasy draft cheat sheets
  - Trophies for league winners or other prizes
  - Fantasy league expert analysis and advice
  - Increased revenue from fantasy league fees due to the inclusion of the features of the invention on existing commissioner websites
  - Revenue from fantasy leagues if the features of the invention are integrated into a new website User Settings Users will be able to configure and customize their interaction with the investing/marketing website or application based on their individual preferences. Preferences may apply to all of a user's fantasy teams, or on a team by team basis. Customizable features may include, but are not limited to:
- Unsolicited Offers—Users will be able to opt in or out of receiving unsolicited offers to purchase their fantasy team (When they have not placed their team up for sale but have an interested potential investor). They will also have an option to only allow unsolicited offers if the offer meets a minimum valuation for their team.
- Investor Partnerships—Users will be able to make themselves available for investor partnerships, which will then allow other investors to view their profile and offer partnership opportunities.
- Investor Pools—Users will be able to make themselves available to be invited into an investor pool.
- Notification preference—Users will be able to choose whether they would like to receive e-mail alerts, website notifications, smart phone notifications, text messages, or any other form of communication available. They may select different notification options for the following events;
  - All bids received for their fantasy team
  - Only bids that meet stated criteria
  - Counter offers to bids made to purchase a fantasy team
  - Rejections of offers to purchase a fantasy team
  - Unsolicited offers to purchase their fantasy team (if they have opted to allow unsolicited offers)
  - Valuations made on their fantasy team
  - Potential Seller questions and/or comments
  - Potential Investor questions and/or comments
  - Proxy votes for fantasy league transactions
  - Proxy votes for investor groups or pools joined FIG. 12 is a block diagram of a software system 900 for marketing fantasy sports and/or stock market teams. The system 900 can be any of the website 12, the website 24 or the application 32 described in FIGS. 1-3, respectively. The system 900 shows how the website or application for fantasy sports and/or stock market investing/marketing can be structured in software algorithm modules. The modules are mentioned only briefly here, as the features and functions of each of the modules have been discussed in detail above.

A selling module 910 includes the features and functions used most commonly by a team owner who wishes to place a fantasy team up for sale or investment. The selling module 910 includes routines for creating web/app pages including; a team sale page, a team prospectus page, a seller profile page, a team information page, and a view offers page. An investing module 920 includes the features and functions used most commonly by a potential investor who wishes to find an opportunity to invest in a fantasy team. The investing module 920 includes routines for creating web/app pages including; an investor profile page, a find investments page, a view investments page, and a bid page.

Several other modules are included in the system 900 to provide additional functionality as described above. A league interface module 930 serves as an interface to league commissioner website data—such as league standings, league prize information, player statistics, and team rosters. The league interface module 930 retrieves league commissioner website data whether within an integrated application as in FIG. 1, from an independent website from a web application as in FIG. 2, or from an independent website from a mobile application as in FIG. 3.

A partnerships & pools module 940 includes features for initiating, establishing and managing investor partnerships and investment pools. These features, described above, include finding suitable investment partners, making investment selections, managing pool funds, proxy voting, etc.

An advertising module 950 includes features for incorporating paid advertising on the web/app pages of the system. This can be done using techniques known in the art, such as by displaying advertising which is tailored to a user's preferences, which may be known from data contained within the system (such as home town and favorite teams), or which may be extracted from data on a user's computer (such as cookies, recently visited websites, etc.).

A deposit account module 960 includes features for electronically managing funds for sellers and investors. As described above, these funds can be used to simplify and automate the execution of investment transactions, prize winning disbursement, and other transactions.

The structure of the software algorithms in the system 900 need not be exactly as shown in FIG. 12. Other suitable designs are certainly possible, where the modules are organized differently, combined, etc. The software system 900 runs on a host computer 990, which would typically be a web application server with internet connectivity in the case of a website, or would be a mobile device in the case of a mobile app.

Figure 13:
FIG. 13 is a flowchart diagram of a method for marketing fantasy sports and/or fantasy stock market teams.

FIG. 13 is a flowchart diagram 1000 of a method for marketing fantasy sports and/or stock market teams. At box 1002, a fantasy sports and/or stock market team is offered for sale or investment by a team owner. As described above and shown in FIG. 4, many options exist for structuring the sale, which can be a fixed price sale or an auction. At box 1004, a potential investor views fantasy team investment opportunities. As described above and shown in FIG. 8, many options exist for finding investment opportunities— from simple browsing to highly filtered searching. At box 1006, an investor makes an offer to buy all of or a share of a fantasy team. As described above, the offer can be for exactly what is listed for sale by a team owner, or for a smaller share, or even an unsolicited offer for a team not listed for sale.

At box 1008, a team owner can choose to accept an offer to buy a share of his fantasy team. The transaction is finalized as discussed above. At box 1010, prize winnings by the fantasy team are shared with the investor based on the percentage stake of the team which was purchased. It is to be understood that the steps of the flowchart diagram 1000 are to be carried out on a computer such as the host computer 990 which has been particularly programmed with the algorithms described in detail above.

Other steps can be added to the method, including features described previously. These features include extracting data from a fantasy sports league commissioner website, establishing investor partnerships and investment pools, incorporating paid advertising into the interaction with sellers and investors, and establishing deposit accounts by sellers and investors.

Using the disclosed techniques, fantasy sports and/or stock market teams can be monetized by their owners, either in part or in total. By facilitating the interaction between fantasy team owners and potential investors, fantasy team owners benefit by being able to market assets which they own and receive income from the sale or investment, where no avenue previously existed for marketing these assets. Likewise, potential investors benefit by being able to find investment opportunities which may be profitable to them, where there was previously no way of knowing of these opportunities.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A computer program containing instructions for causing a computer to perform the method of:
   offering a fantasy team for sale by a team owner, wherein offering a fantasy team for sale includes defining a flexibility factor for the fantasy team by the team owner, where the flexibility factor is used to establish restrictions on substitutions in a team which may be made by the team owner without investor approval, where a higher flexibility factor allows greater substitution flexibility to the team owner;
   viewing available fantasy team investment opportunities by an investor;
   making an offer to buy a share of the fantasy team by the investor;
   accepting the offer to buy the share of the fantasy team by the team owner; and
   communicating fantasy team prize winnings to be shared with the investor by the team owner.

2. The computer program according to claim 1 wherein the computer performs the method as an Internet website with integrated fantasy sports or fantasy stock market league capabilities.

3. The computer program according to claim 1 wherein the computer performs the method as a mobile device application which can interact with existing fantasy sports or fantasy stock market league commissioner websites.

4. The computer program according to claim 1 wherein the computer performs the method as a stand-alone Internet website which interacts with fantasy sports or fantasy stock market league commissioner websites, including automatically retrieving league-related information from the fantasy sports or fantasy stock market league commissioner websites.

5. The computer program according to claim 4 wherein the league-related information includes league name, prize payout information, owner ratings, league standings, team statistics and team rosters.

6. The computer program according to claim 1 wherein offering a fantasy team for sale includes creating web or application pages including; a team sale page, a team prospectus page, a seller profile page, a team information page, and a view offers page.

7. The computer program according to claim 6 wherein the team sale page is used by team owners to offer a team for sale, and includes fields for an owner sales pitch, a percentage of the team to be offered for sale, options to allow offers for a higher or lower percentage of the team, whether the sale is to be a fixed price or a bid, an offer ending date, an automatic sale price and a flexibility factor.

8. The computer program according to claim 6 wherein the team prospectus page includes data from the team sale page, and also includes fields for fantasy league name, fantasy league entry fee, league prize payout values, playoff format, team owner ratings and current league standings.

9. The computer program according to claim 6 wherein the seller profile page is used by team owners to create a seller profile which can be viewed by investors, and includes fields for seller age, seller hometown, seller's favorite teams and seller's previous team performance history.

10. The computer program according to claim 6 wherein the team information page is created by team owners and viewed by investors to provide more detailed information about a team for sale, and includes fields for team owner's profile, team owner's team performance and transaction history, team roster, and league information.

11. The computer program according to claim 6 wherein the view offers page is used by team owners to view offers which have been made for their team, includes options for filtering and sorting offers based on price and percentage, and includes fields for bidder name, bidder rating, amount of bid, percentage of team bid upon, team valuation and bidder comments.

12. The computer program according to claim 1 wherein viewing available fantasy team investment opportunities includes creating web or application pages including; an investor profile page, a find investments page, a view investments page, and a bid page.

13. The computer program according to claim 12 wherein the investor profile page is used by investors to create an investor profile which can be viewed by team owners, and includes fields for investor's name, age, home town, contact information, favorite teams, ratings and other investments.

14. The computer program according to claim 12 wherein the find investments web page is used by investors to search for investment opportunities, and includes fields for defining search criteria including sport, prize payout range, prize payout type, flexibility factor, teams' for-sale status, specified players, league age, league scoring system and team owner ratings.

15. The computer program according to claim 12 wherein the view investments page is used by investors to view investment opportunities which meet their search criteria, and includes a listing of the search criteria which were applied, along with a team summary of teams which meet the search criteria, where the team summary includes a sales pitch, a list of top three scorers and current league standing position.

16. The computer program according to claim 12 wherein the bid page is used by investors to make a bid for all or part of a team, and includes fields for percentage of team bid upon, amount of bid, valuation and bidder comments, and where the bid page further includes an option to submit a non-bid valuation of the team, an option to search for potential investing partners with similar valuations of the team, and an option to view other bidders who may be interested in forming a partnership.

17. The computer program according to claim 1 wherein the method performed by the computer further includes creating partnerships and pools, including an investor partnership feature where the investors can create a partnership to invest in a team, and including an investment pool feature where the investors can pool funds to invest in multiple teams.

18. The computer program according to claim 1 wherein the method performed by the computer further includes displaying paid advertising on web or application pages created by the computer.

19. The computer program according to claim 1 wherein the method performed by the computer further includes creating deposit accounts where the team owners and the investors may keep a balance of funds, where the funds may be used by the investors for payments for purchase transactions, and used by the team owners for disbursement of league prize winnings.

20. The computer program according to claim 1 where the flexibility factor defines a maximum point rating difference between a normal starting player and a substitute player.

* * * * *